United States Patent
Okabe et al.

(10) Patent No.: US 6,288,152 B1
(45) Date of Patent: Sep. 11, 2001

(54) ROOM-TEMPERATURE CURABLE SILICON RUBBER COMPOSITION

(75) Inventors: Kazutoshi Okabe; Hiroshi Adachi; Toshio Saruyama, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/438,637

(22) Filed: Nov. 12, 1999

(30) Foreign Application Priority Data

Nov. 20, 1998 (JP) .................................. 10-330084
Nov. 24, 1998 (JP) .................................. 10-332821

(51) Int. Cl.$^7$ .................................................. C08K 5/315
(52) U.S. Cl. ........................ 524/205; 524/86; 524/102; 524/236; 524/500; 525/477; 528/17
(58) Field of Search ............................. 524/86, 236, 588, 524/500, 477, 205, 102; 528/17

(56) References Cited

U.S. PATENT DOCUMENTS

| | | | |
|---|---|---|---|
| 4,111,890 | 9/1978 | Getson et al. | ............................ 260/37 |
| 4,898,910 | * 2/1990 | Kamis et al. | . |
| 5,021,478 | * 6/1991 | Ravichandran et al. | . |
| 5,340,899 | * 8/1994 | Altes | . |
| 5,840,794 | * 11/1998 | Palmer | . |

FOREIGN PATENT DOCUMENTS

| | | | |
|---|---|---|---|
| 32 21 655 | 12/1983 | (DE) | ................................. C09K/3/10 |
| 0 625 548 | 11/1994 | (EP) | ................................. C08L/83/04 |
| 0 787 766 | 8/1997 | (EP) | ................................. C08K/5/00 |
| 0 802 233 | 10/1997 | (EP) | ................................. C08L/83/04 |
| 62-252456 | 11/1987 | (JP) | . |

* cited by examiner

Primary Examiner—Robert Dawson
Assistant Examiner—Marc S. Zimmer
(74) Attorney, Agent, or Firm—Jennifer S. Warren

(57) ABSTRACT

A room-temperature curable silicone rubber composition that excels in bonding durability.
comprises. The present invention is a room-temperature curable composition comprising:

(A) 100 parts by weight of a polydiorganosiloxane comprising
  (A-1) 20 to 100 parts by weight of a first polydiorganosiloxane,
  (A-2) 0 to 80 parts by weight of a second polydiorganosiloxane;
(B) 1 to 20 parts by weight of an alkoxysilane or an alkoxysilane partial hydrolysis condensate;
(C) 0.5 to 10 parts by weight of an organo-titanium compound;
(D) 0.01 to 5 parts by weight of an additive selected from light stabilizers and UV absorbers.

9 Claims, 1 Drawing Sheet

ROOM-TEMPERATURE CURABLE SILICON RUBBER COMPOSITION

FIELD OF THE INVENTION

The present invention is a room-temperature curable silicone rubber composition. In particular, it is a room-temperature curable silicone rubber composition that provides excellent bonding durability after being cured, so that it retains a high degree of bonding power even when it is used outdoors for a long period of time.

BACKGROUND OF THE INVENTION

Many room-temperature curable silicone rubber compositions are known that turn into silicone rubber after being cured at room temperature upon contact with the water in air. Among these are room-temperature curable silicone rubber compositions with the main constituents of polydiorganosiloxane and alkoxysilane that have alkoxysilyl groups on both ends of a molecular chain and that harden by releasing alcohol in the presence of an organo-titanium compound catalyst (also known as de-alcohol curable room-temperature curable silicone rubber compositions). These compositions find many applications as sealants for electric and electronic devices, bonding agents, and construction material sealants because of the absence of a noxious odor and their propensity not to corrode metals (see Japanese Patent Application No. 39-27643, Japanese Patent Application No. 55-43119, and Japanese Patent Application No. 62-252456). These types of room-temperature curable silicone rubber compositions, however, have a disadvantage in that their bonding capacity declines as a function of aging when the material is used outdoors for sealing or bonding glass for a long period of time. Therefore, these compositions are not completely satisfactory as construction material sealants, for example.

To solve the above problems, the inventors discovered that the addition of small amounts of a light stabilizer and/or a UV absorber to de-alcohol curable room-temperature curable silicone rubber compositions containing a specific polydiorganosiloxane as a main constituent solves the above problems, and consequently, have resulted in the present invention.

SUMMARY OF THE INVENTION

The present invention is a room temperature curable composition comprising:
(A) 100 parts by weight of a polydiorganosiloxane comprising
  (A-1) 20 to 100 parts by weight of a first polydiorganosiloxane,
  (A-2) 0 to 80 parts by weight of a second polydiorganosiloxane;
(B) 1 to 20 parts by weight of an alkoxysilane or an alkoxysilane partial hydrolysis condensate;
(C) 0.5 to 10 parts by weight of an organo-titanium compound;
(D) 0.01 to 5 parts by weight of an additive selected from light stabilizers and UV absorbers.

The purpose of the present invention is to provide a room-temperature curable silicone rubber composition that excels in bonding durability and that can retain its bonding power even when used outdoors for a long period of time.

EXPLANATION OF REFERENCE NUMERALS

Figure 1:
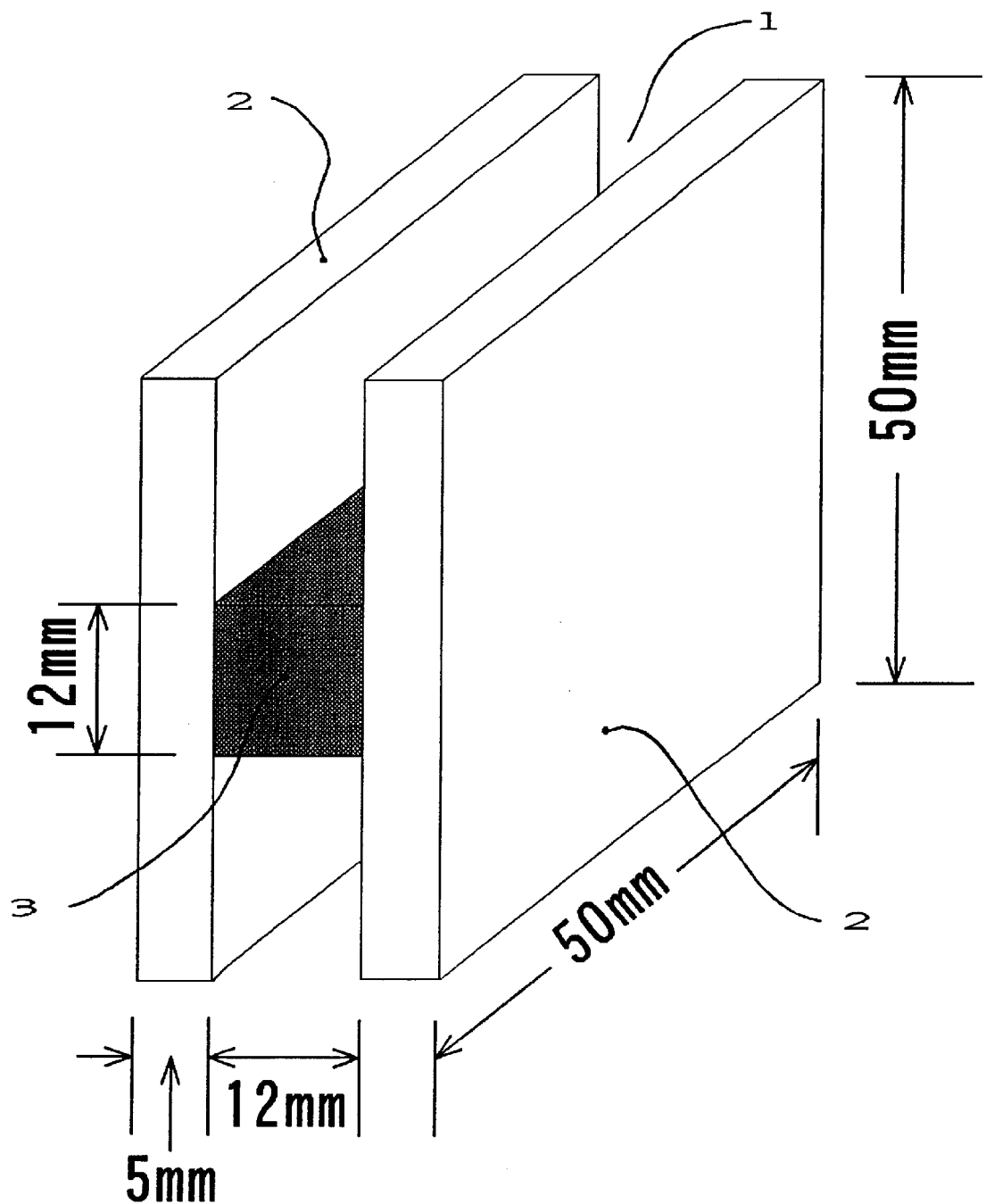
FIG. 1 is a schematic diagram of the bonding durability test piece that was used for the evaluation of the bonding durability of the room-temperature curable silicone rubber composition in Examples 1–4 and Comparison Examples 1–2.

| 1 | Bonding durability test piece |
| 2 | Float plate glass |
| 3 | Silicone rubber composition |

DETAILED DESCRIPTION OF INVENTION

The present invention is a room-temperature curable silicone rubber composition comprising:
(A) 100 parts by weight of a polydiorganosiloxane comprising
  (A-1) 20 to 100 parts by weight of a first polydiorganosiloxane, expressed by a general formula:

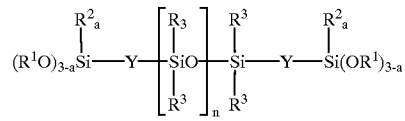

where $R^1$ and $R^2$ are an alkyl or an alkoxyalkyl, $R^3$ is a monovalent hydrocarbon group, a halogenated hydrocarbon group, or a cyanoalkyl group, a is either 0 or 1, n is an integer that provides a viscosity of 20 to 1,000,000 mPa.s at 25° C., Y is an oxygen atom, a bivalent hydrocarbon group, or a group expressed by a general formula:

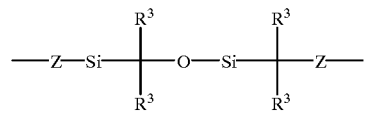

where $R^3$ is as defined above, and Z is a bivalent hydrocarbon group;
  (A-2) 0 to 80 parts by weight of a second polydimethylsiloxane expressed by a general formula:

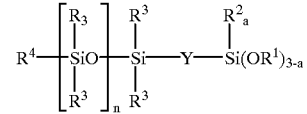

where $R^1$, $R^2$, $R^3$, Y, a, and n are as defined above, and $R^4$ is an alkyl or alkenyl group;
(B) 1 to 25 parts by weight of a cross-linking agent selected from an alkoxysilane expressed by the general formula $R^5_b Si(OR^6)_{4-b}$,
where $R^5$ is a monovalent hydrocarbon group, $R^6$ is an alkyl group or an alkoxyalkyl group, and b is either 0 or 1,
and a partial hydrolysis condensate of such an alkoxysilane;
(C) 0.5 to 10 parts by weight of an organo-titanium compound; and
(D) 0.01 to 5 parts by weight of an additive selected from a light stabilizer and a UV absorber.

The polydiorganosiloxane of Component (A) used in the present invention is the main ingredient of the compositions of the present invention and comprises Components (A-1) and (A-2). Component (A-1) is a first polydiorganosiloxane having either an alkoxy or alkoxy-alkoxy group that is a hydrolyzable group occurring at both ends of a molecular chain. $R^1$ and $R^2$ in the above formula are alkyl groups such as a methyl, ethyl, propyl, or butyl groups; or alkoxyalkyl groups such as a methoxyethyl, ethoxyethyl, methoxypropyl, or methoxybutyl groups. $R^3$ is an alkyl group such as a methyl, ethyl, propyl, or butyl group; a cycloalkyl group such as a cyclopentyl or cyclohexyl group; an alkenyl group such as a vinyl or allyl group; an aryl group such as a phenyl, tolyl, or naphthyl group; an aralkyl group such as a benzyl, phenylethyl or phenylpropyl group; a halogenated hydrocarbon group such as a chloromethyl, trifluoropropyl, or chloropropyl group; or a cyanoalkyl group such as β-cyanoethyl, γ-cyanopropyl, or γ-cyanopropyl group. Among these, the methyl group is preferable. Examples of bivalent hydrocarbon groups of Components Y and Z include methylene, propylene, and butylene groups.

Component (A-2) is a second polydiorganosiloxane having either an alkoxy or alkoxyalkoxy group that is a hydrolyzable group and that occurs only at the end of a molecular fragment chain. Component (A-2) has the property of reducing the modulus of the silicone rubber produced when the composition of the present invention is cured. Component (A-2) has a general formula

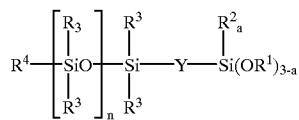

where the groups $R^1$, $R^2$, $R^3$, a, n, and Z are as described in connection with Component (A-1) above, and $R^4$ denotes an alkyl group such as a methyl, ethyl, propyl, or butyl group, or an alkenyl group such as a vinyl or allyl group. Component (A) is polydiorganosiloxane comprising per 100 weight parts, 20 to 100 parts by weight of Component (A-1) and 0 to 80 parts by weight of Component (A-2).

Component (B) is a cross-linking agent, and selected from an alkoxysilanes and alkoxysilane partial hydrolysis condensate. When selected from alkoxysilanes, Component (B) can be represented by the following general formula:

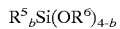
$R^5_b Si(OR^6)_{4-b}$ where $R^5$ is an alkyl group such as a methyl, ethyl, or propyl group; or a monovalent hydrocarbon group such as a vinyl, allyl, and related alkenyl group; where $R^6$ is an alkyl group such as a methyl, ethyl, propyl, or butyl group, or an alkoxyalkyl group such as a methoxyethyl, ethoxyethyl, methoxypropyl, or methoxybutyl group; and where b is either 0 or 1.

Examples of Component (B) include: tri-functional alkoxysilanes such as methyl-trimethoxysilane, methyl-triethoxysilane, ethyl-trimethoxysilane, vinyl-trimethoxysilane, phenyl-trimethoxysilane, and methyl-trimethoxysilane; tetra-functional alkoxysilanes such as tetra-methoxysilane and tetra-ethoxysilane; and their hydrolyzed condensation products. Component (B) can be made either by using these compounds singly or by mixing two or more of the same.

Component (B) should be added in a range of about 1 to 25 parts by weight, and preferably 2 to 10 parts by weight, for 100 parts by weight of Component (A). An additive amount that is too low results in inadequate curing of the composition of the present invention or in gelling during storage due to an increase in viscosity. On the other hand, using an excessive amount of additive can result in high cost.

The organo-titanium compound, Component (C), used in the present invention is a catalyst for the curing of the composition of the present invention. Examples of such a titanium compound include: tetra-(i-propoxy)titanium, tetra (n-butoxy)titanium, tetra-t-butoxy)titanium, and other titanic acid esters; and titanium chelates such as di-(i-isopropoxy)bis-(acetoacetateethyl)titanium, di-(i-isopropoxy)bis-(acetoacetatemethyl)titanium, and di-(i-isopropoxy)bis-(acetylacetone)titanium.

Component (C) should be added in a range of 0.5 to 10 parts by weight relative to 100 parts by weight of Component (A); preferably, it should be used in a range of 1 to 5 parts by weight range. An additive amount that is too low results in slow curing of the composition of the present invention. An excessive amount of the additive causes poor storage stability and high cost.

The light stabilizer and/or UV absorber, which form Component (D), represent a key feature of the present invention, acting to confer bonding durability on the composition of the present invention. In general light stabilizers and UV absorbers that are added to organic resins or organic rubbers in order to enhance their weather resistance can be used as the aforementioned light stabilizers and UV absorbers. Among these, in the present invention light stabilizers composed of hindered amine compounds are desirable. Examples of these light stabilizers composed of hindered amine compounds include compounds that can be represented by the following structural formulas:

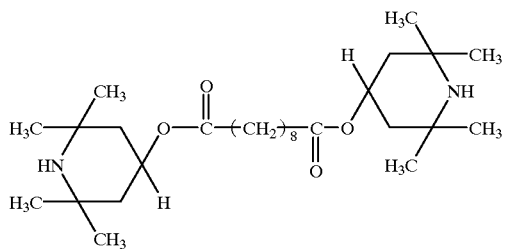

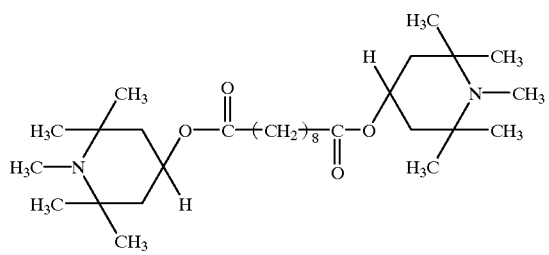

-continued

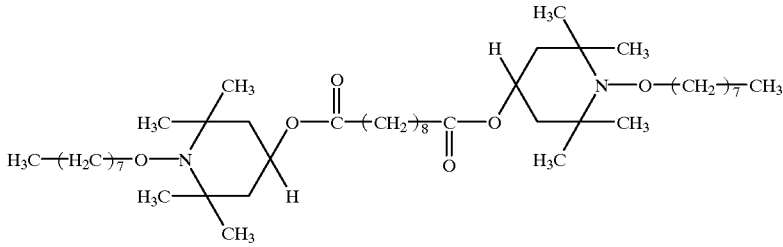

The following products can also be cited as examples: Adekastab LA-52, Adekastab LA-57, Adekastab LA-62, Adekastab LA-67, Adekastab LA-63P, and Adekastab LA-68LD (trademarks of Asahi Denka Kogyo K.K.), and CHIMASSORB944 and CHIMASSORB 119 (trademarks of Ciba Specialty Chemical K.K.).

Examples of WV absorbers that can be used include benzotriazole compounds, benzophenone compounds, arylester compounds, cyanoacrylate compounds, and triazine compounds. Among these, UV absorbers composed of cyanoacrylate and triazine compounds are preferable. Examples of WV absorbers composed of cyanoacrylate compounds include compounds that can be represented by the following structural formulas:

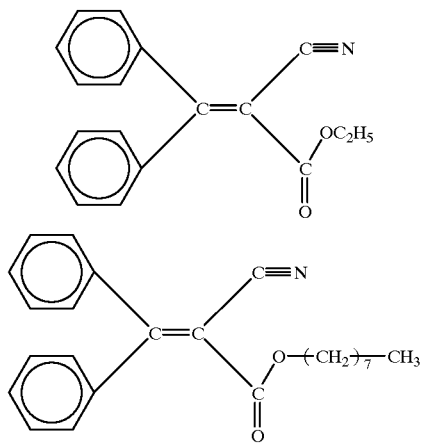

Similarly, examples of UV absorbers composed of triazine compounds include compounds that can be represented by the following structural formula:

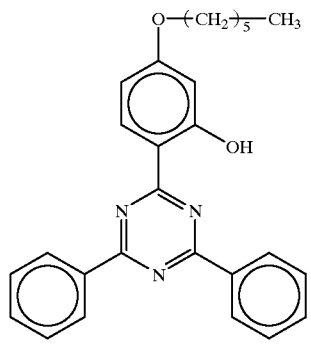

Component (D) should be added in a range of 0.01 to 5 parts by weight relative to 100 parts by weight of Component (A); preferably, it should be used in a range of 0.1 to 2 parts by weight. An additive amount that is too low results in reduced bonding durability, and an excessive amount of the additive causes a reduced bonding capacity and mechanical strength. Preferably Component (D) should be added as a combination of a light stabilizer and a UV absorber. When these agents are used in combination, the light stabilizer and UV absorber should be mixed in a weight ratio range of (1:0.1) to (1:2).

In order to achieve further enhancement of the bonding capacity of the composition of the present invention, composed of Components (A) through (D), the following silane coupling agents may be added in addition to the named components: a silane coupling agent containing amino groups, a coupling agent containing epoxy groups, and a silane-coupling agent containing silane and mercapto. These silane-coupling agents can be used either singly or in a combination of two or more silane-coupling agents. Reaction mixtures of silane-coupling agents containing organic amines and amino groups, and those containing epoxy groups can also be used.

Of the above-mentioned components, those containing amino groups provide an especially improved bonding capacity and are therefore effective.

Further, the following compounds can be added to ensure a low modulus for the cured rubber elastic material: bi-functional alkoxysilanes including dimethyl dimethoxy silane and diphenyl dimethoxy silane; and dimethyl polysiloxane, and dimethylsiloxane oligomer.

To an extent that does not deviate from the purpose of the present invention, the composition of the present invention, composed of Components (A) through (D), can be blended with known additives that are mixed with silicone rubber compositions, in addition to the components just mentioned. Such additives include: inorganic fillers, organic solvents, anti-mildew agents, flame retardants, heat resistant agents, plasticizers, thixotropic agents, adhesiveness-conferring agents, hardening accelerators, and pigments. Examples of inorganic fillers include aerosol silica, precipitating silica, quartz fine powder, calcium carbonate, aerosol titanium dioxide, diatomaceous earth, aluminum hydroxide powder, alumina powder, magnesium powder, zinc oxide powder, and zinc carbonate powder; and these substances made hydrophobic through surface treatment with organo silanes, silazanes, and siloxane oligomers.

The composition of the present invention can be easily manufactured by uniformly mixing Components (A) through (D) and the various additives in the absence of humidity.

The composition of the present invention thus obtained should be stored in a hermetically sealed container. When exposed to air prior to use, the composition is cured by water present in the air, turning into a silicone rubber that has a rubber-like elasticity.

The composition of the present invention, as described above, possesses the characteristic of retaining its bonding capacity even when exposed to the elements outdoors for a long period of time. The composition is highly effective when used in applications for which this characteristic is required, including building material sealant, and especially construction material sealant that is applied to glass and other optically transparent materials.

The curable composition of the present invention, comprising Components (A) through (D), specifically containing a prescribed amount of Component (D), which is a light stabilizer and/or UV absorber, excels in bonding durability. As such, it has the characteristic of retaining the bonding capacity even when used outdoors for a long period of time.

EXAMPLES

A description of the present invention with reference to the examples follows. In the following examples, all viscosity values are measured at 25° C. Also, in the following the abbreviation "Me" refers to a methyl group and "Et" to an ethyl group. The bonding durability of the room-temperature curable silicone rubber composition was evaluated using the following method:

Method for the Evaluation of the Bonding Durability ofthe Room-Temperature Curable Silicone Rubber Composition A bonding durability test piece was prepared according to the method set forth in JIS A 1439, Construction Material Sealant Test Methods. Referring to FIG. 1, a bonding durability test piece 1 (also referred to as a "type H test piece"), was prepared by packing the room-temperature curable silicone rubber composition 3 between two float glass plates 2 (as defined under JIS R3202). Subsequently, the room-temperature curable silicone rubber composition was cured by holding it in quiescence for 28 days at 23° C. and 50% humidity. After that, bonding durability test pieces thus obtained were placed in a fluorescent UV light-reinforced accelerated exposure test apparatus (commercial name UVCON UC-1 made by Atlas Co., Ltd.). According to ASTM G53, the bonding durability test pieces were irradiated with UV rays across a glass plate by using a UVA-340 fluorescent lamp. Following the UV irradiation, bonding durability test pieces were removed after 1,000 hours, 2,000 hours, and 3,000 hours. They were subjected to stretching tests based upon JIS A1439, and the state of the silicone rubber breakage was observed.

The results were noted as follows:

○: Breakage at the silicone rubber layer (cohesive failure rate: 100%)

▲: Partial boundary peeling (cohesive failure rate: 50–99%)

X: Boundary peeling (cohesive failure rate: 0–49%)

EXAMPLE 1

A silicone rubber base compound was prepared by mixing 40 parts by weight of α,ω-triethoxysilylethylenepolydimethylsiloxane, indicated by Formula 1 below (where n denotes an integer that produces a viscosity of 15,000 mPa.s) with a 15,000 mPa.s viscosity; 60 parts by weight of α-methyl, ω-triethoxysilylethylenepolydimethylsiloxane, indicated by Formula 2 below (where n denotes an integer that produces a viscosity of 15,000 mpa.s) with a 15,000 mPa.s viscosity; and 12 parts by weight of dry-method silica with a BET method specific surface of 130 m²/g that was surface treated with dimethyldimethoxy silane and hexamethyl silazane. After that, the silicone rubber-base compound was mixed with 4.5 parts by weight of methyltrimethoxysilane, 3.0 parts by weight of tetra-(t-butoxy)titanium, and 0.5 parts by weight of a reaction mixture of γ-aminopropyltrimethoxysilane and γ-glycidoxypropyltrimethoxysilane (obtained by mixing γ-aminopropyltrimethoxy silane and γ-glycidoxypropyltrimethoxysilane in a 1:2 molar ratio and by holding the mixture in quiescence for four weeks under conditions of 25° C. temperature and 50% humidity). Subsequently, 0.3 parts by weight of the light stabilizer (commercial name SANOL LS-770 made by Sankyo Co., Ltd.) indicated by Formula 3 below and 0.3 parts by weight of the UV absorber (commercial name Viosorb 930 made by Kyodo Chemical Co., Ltd.) indicated by Formula 4 below were mixed under a moisture excluded condition until the mixture was uniform. In this manner, a room-temperature curable silicone rubber composition was produced. The bonding durability of the room-temperature curable silicone rubber composition was measured and the results are summarized in Table 1 below.

Formula 1

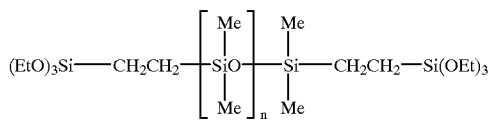

Formula 2

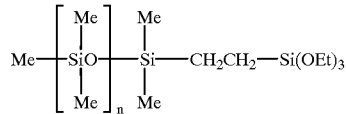

Formula 3

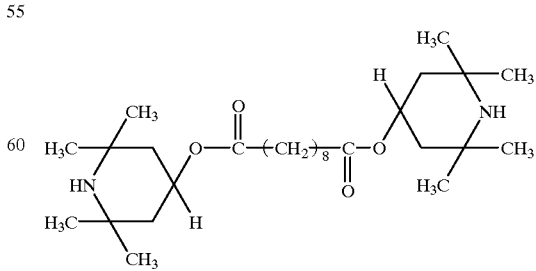

-continued

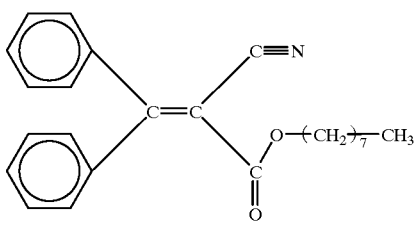

Formula 4

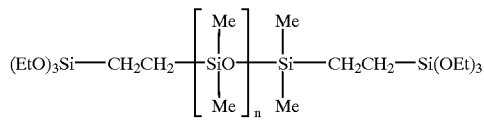

Formula 5

EXAMPLE 2

A room-temperature curable silicone rubber composition was produced as in Example 1, except that the light stabilizer indicated by Formula 3, 0.3 parts by weight in Example 1, was not mixed. The bonding durability of the room-temperature curable silicone rubber composition was measured as in Example 1 and the results are summarized in Table 1 below.

EXAMPLE 3

A room-temperature curable silicone rubber composition was produced as in Example 1, except that the UV absorber indicated by Formula 4, 0.3 parts by weight in Example 1, was not mixed. The bonding durability of the room-temperature curable silicone rubber composition was measured as in Example 1 and the results are summarized in Table 1 below.

EXAMPLE 4

A silicone rubber base compound was prepared by mixing 100 parts by weight of α,ω-triethoxysilyl ethylene polydimethylsiloxane with a viscosity of 15,000 mPa.s, indicated by Formula 5, and 12 parts by weight of dry-method silica with a BET method specific surface of 130 m²/g that was surface treated with dimethyl dimethoxy silane and hexamethyl silazane. After that, the silicone rubber-based compound was mixed with 4.5 parts by weight of methyl trimethoxy silane, 3.0 parts by weight of tetra-(t-butoxy)titanium, and 0.5 parts by weight of a reaction mixture of γ-aminopropyl trimethoxy silane and γ-glycidoxy propyl trimethoxy silane (obtained by mixing γamino propyl trimethoxy silane and ω-glycidoxy propyl trimethoxy silane in a 1:2 molar ratio and by holding the mixture in quiescence for four weeks under conditions of 25° C. temperature and 50% humidity). Subsequently, 0.3 parts by weight of the light stabilizer (commercial name SANOL LS-770 made by Sankyo Co., Ltd.) indicated by Formula 3 in Example 3 and 0.3 parts by weight of the UV absorber (commercial name Viosorb 930 made by Kyodo Chemical Co., Ltd.) indicated by Formula 4 were mixed under a moisture excluded condition until the mixture was uniform. In this manner, a room-temperature curable silicone rubber composition was produced. The bonding durability of the room-temperature curable silicone rubber composition was measured and the results are summarized in Table 1 below.

Comparasion Example 1

Referring to Example 1, a room-temperature curable silicone rubber composition was produced as in Example 1, except that neither 0.3 parts by weight of light stabilizer nor 0.3 parts by weight of UV absorber was nixed. The bonding durability of the room-temperature curable silicone rubber composition was measured and the results are summarized in Table 1 below.

Comparasion Example 2

Referring to Example 3, a room-temperature curable silicone rubber composition was produced as in Example 3, except that 0.3 parts by weight of triethyl amine was substituted for 0.3 parts by weight of light stabilizer. The bonding durability of the room-temperature curable silicone rubber composition was measured and the results are summarized in Table 1 below.

Comparasion Example 3

Referring to Example 3, a room-temperature curable silicone rubber composition was produced as in Example 3, except that 0.3 parts by weight of γ-amino propyl trimethoxy silane was substituted for 0.3 parts by weight of light stabilizer. The bonding durability of the room-temperature curable silicone rubber composition was measured and the results are summarized in Table 1 below.

TABLE 1

| | Adhesion durability results | | | | | | |
|---|---|---|---|---|---|---|---|
| UV irradiation | Example | | | | Comparison example | | |
| time | 1 | 2 | 3 | 4 | 1 | 2 | 3 |
| 0 hours (initial condition) | ○ | ○ | ○ | ○ | ○ | ○ | ○ |
| 1,000 hours | ○ | ○ | ○ | ○ | ○ | ○ | ○ |
| 2,000 hours | ○ | ○ | ○ | ○ | ▲ | ▲ | ▲ |
| 3,000 hours | ○ | ▲ | ○ | ○ | ▲ | ▲ | ▲ |
| 5,000 hours | ○ | ▲ | ▲ | ○ | ▲ | ▲ | ▲ |

We claim:

1. A room-temperature curable silicone rubber composition comprisings (A) 100 parts of a polydiorganosiloxane comprising:

(A-1) 20 to 100 parts by weight of a first polydiorganosiloxane, expressed by a general formula:

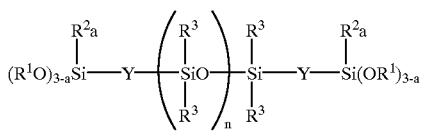

where $R^1$ and $R^2$ denote an alkyl or alkoxyalkyl group, $R^3$ denotes a group chosen from among a monovalent hydrocarbon group, a halogenated hydrocarbon group, or a cyanoalkyl group; where a is either 0 or 1; where n is an integer that provides a viscosity of 20 to 1,000,000 mPa.s at 25° C.; and where Y is an oxygen atom, a bivalent hydrocarbon group, or a group expressed by a general formula:

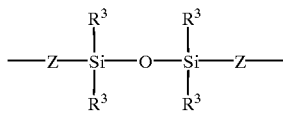

where $R^3$ is as defined above, and Z is a bivalent hydrocarbon group; and (A-2) 100 parts by weight of a second polydiorganosiloxane expressed by a general formula:

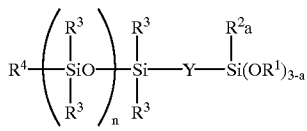

(where $R^1$, $R^2$, and $R^3$ are as defined above, where $R^4$ is an alkyl or alkenyl group, and where Y, a, and n are as defined above);

(B) 1 to 25 parts by weight of a cross-linking agent selected from alkoxysilanes expressed by the general formula $R^5{}_b Si(OR^6)_{4-b}$, (where $R^5$ is a monovalent hydrocarbon group, $R^6$ is an alkyl or alkoxyalkyl group, and b is either 0 or 1) and partial hydrolysis condensates of such alkoxysilanes;

(C) 0.5 to 10 parts by weight of an organo-titanium compound; and (D) 0.01 to 5 parts by weight of a UV absorber selected from cyanoacrylates represented by the structural formulas

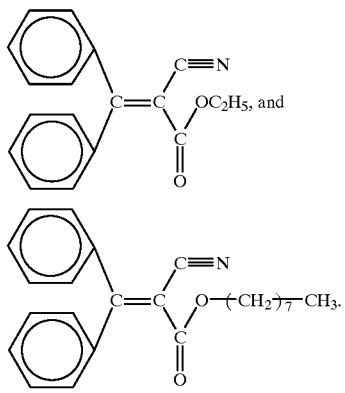

2. The room-temperature curable silicone rubber composition of claim 1, wherein the Component Y in the Components (A-1) and (A-2) is an alkylene group.

3. The room-temperature curable silicone rubber composition of claim 1, wherein Component (B) is selected from the group consisting of tri-functional alkoxysilanes, tetrafunctional alkoxysilanes, the partial hydrolysis condensates of tri-functional alkoxysilanes, and the partial hydrolysis condensates of tetrafunctional alkoxysilanes.

4. The room-temperature curable silicone rubber composition of claim 1 wherein Component (B) is used at 2 to 10 parts by weight for each 100 parts by weight of Component (A).

5. The room-temperature curable silicone rubber composition of claim 1 wherein the organo-titanium compound of Component (C) is selected from the group consisting of titanic acid esters and titanium chelates.

6. The room-temperature curable silicone rubber composition of claim 1 further comprising an amine-based light stabilizer selected from compounds represented by the structural formulas:

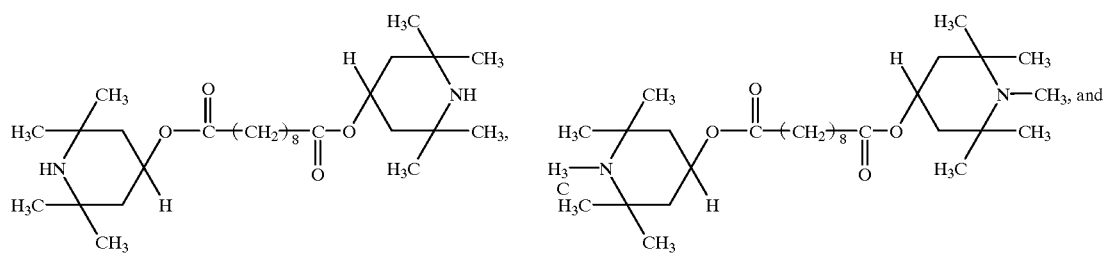

-continued

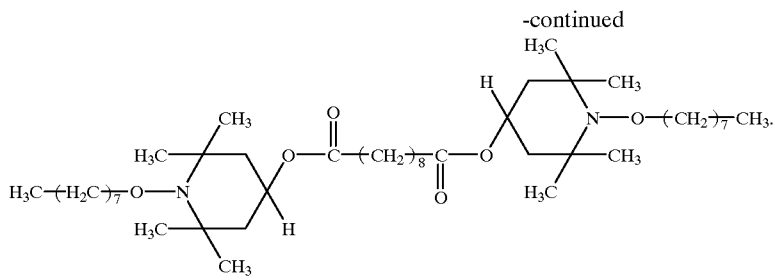

7. The room-temperature curable silicone rubber composition of claim 1, further comprising a silane coupling agent selected from the group consisting of silane coupling agents containing amino groups, silane coupling agents containing epoxy groups, silane coupling agents containing mercapto groups, and reaction mixtures made from the reaction of silane coupling agents containing amine and amino groups and those containing epoxy groups.

8. The room-temperature curable silicone rubber composition of claim 7 wherein the silane coupling agent is a reaction mixture of γ-aminopropyltrimethoxysilane and γ-glycidoxypropyltrimethoxysilane.

9. The room temperature curable silicone rubber composition of claim 6 wherein the amine-based light stabilizer and the UV absorber are in a ratio of from 1:0.1 to 1:2 by weight.

* * * * *